United States Patent
Sharma et al.

(10) Patent No.: US 6,636,906 B1
(45) Date of Patent: Oct. 21, 2003

(54) APPARATUS AND METHOD FOR ENSURING FORWARD PROGRESS IN COHERENT I/O SYSTEMS

(75) Inventors: Debendra Das Sharma, Santa Clara, CA (US); Sharon M. Ebner, Mountain View, CA (US); John A. Wickeraad, Granite Bay, CA (US); Joe P. Cowan, Fort Collins, CO (US); Carl H. Jackson, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,553

(22) Filed: Apr. 28, 2000

(51) Int. Cl.[7] .............................................. G06F 13/28
(52) U.S. Cl. ...................... 710/22; 710/129; 711/141; 711/146; 711/145; 711/163
(58) Field of Search ................... 710/129, 22; 711/146, 711/145, 163, 141

(56) References Cited

U.S. PATENT DOCUMENTS

| | | | | |
|---|---|---|---|---|
| 5,511,226 A | * | 4/1996 | Zilka | 395/823 |
| 5,715,428 A | * | 2/1998 | Wang et al. | 711/141 |
| 5,737,545 A | * | 4/1998 | Wszolek et al. | 710/107 |
| 5,737,756 A | * | 4/1998 | White et al. | 711/118 |
| 6,065,077 A | * | 5/2000 | Fu | 709/233 |
| 6,157,977 A | * | 12/2000 | Sherlock et al. | 710/129 |
| 6,412,046 B1 | * | 6/2002 | Sharma et al. | 711/137 |

* cited by examiner

Primary Examiner—Jeffrey Gaffin
Assistant Examiner—Niketa Patel
(74) Attorney, Agent, or Firm—Clare T. Hartnett

(57) ABSTRACT

A snapshot mechanism that includes an apparatus and method for tracking DMA read requests for cacheable data that can be altered before the data is returned to a requesting I/O device is herein disclosed. Attributes that uniquely identify the original I/O device and DMA read request are stored in a cache tag unit. A read lock is set when a request is made to obtain the requested data when it is not resident in a local cache. When the cache line containing the requested data is snooped out and the read lock is set, then the cache line is set in a snapshot state. The snapshot state assures that only the original I/O device receives the read data when it has been altered subsequent to the time the original DMA read request was made. Once the data is returned to the original I/O device, the cache line is invalidated in order to prevent another I/O device from reading the stale data. Prefetched data is marked as such and cannot be marked as snapshot data.

8 Claims, 8 Drawing Sheets

APPARATUS AND METHOD FOR ENSURING FORWARD PROGRESS IN COHERENT I/O SYSTEMS

FIELD OF THE INVENTION

The present invention relates generally to computer systems. More particularly, the invention relates to a mechanism for ensuring forward progress in coherent I/O systems.

BACKGROUND OF THE INVENTION

A current trend in the design of I/O systems is to use a cache in the host bridge for transferring data to and from I/O devices. The presence of one or more caches in the host bridge means that the host bridge has to participate in cache coherency actions including resolving conflicts when the same cache line is accessed by multiple caches. For example, several I/O devices and processors can access a common semaphore that synchronizes multiple accesses for a shared resource in an atomic manner. It is also common in some I/O systems for two or more disk arrays to store the same data in each disk array. In this manner, the data is available in the event of a failure of one of the disk arrays. By way of another example, portions of data can be used by one device for one purpose and another portion of the same data can be used by another device for another purpose. For instance, the lower bytes of a cache line can be used for one I/O device to control memory bus traffic whereas the upper bytes of the same cache line can be used for another device to also control traffic to the processor bus.

Typically, an I/O system utilizes one or more caches to store data accessed by the I/O devices. The use of multiple caches in the system requires a cache coherency mechanism to ensure that the data in the caches and in main memory remain coherent.

A problem that often arises in a cache coherent I/O system is the increased latency time that is involved in accessing the data when it does not reside in the cache associated with the requesting I/O device. This latency may be attributed to a remote source that has the data and may also be due to the bus protocol used by the requesting I/O device.

For example, in some I/O systems, the Peripheral Component Interface ("PCI") bus is used as the communication link that interconnects various I/O devices to a host bridge that interfaces with a system memory bus. The PCI bus interface issues a retry command to a requesting I/O device when the host bridge does not have the requested data so that other devices may use the PCI bus while the host bridge obtains the requested data. The requesting I/O device will make a subsequent request for the data and if available, the host bridge will return the data to the device.

It may be possible for the cache to loose the cache line ownership due to a snoop request by another cache before the original request that requested the cache line data came back with the requested data. This may happen due to another device in another cache unit or another processor trying to access the same cache line. When the requested data comes back from the device, the cache controller will re-request the cache line from the system and retry the I/O device. It is possible for two I/O devices under two different cache units to request access to the same cache line data. Immediately after one cache unit obtains ownership of the cache line, a second cache unit issues a snoop request. The first cache unit gives up ownership of the cache line before its I/O device has a chance to get the data. When the I/O device comes back with the requested data, the first cache unit re-requests the cache line which will snoop out the cache line from the second cache unit before the second cache unit services the data to its requesting I/O device. In this situation, the cache line is being transmitted back and forth between the two cache units without either requesting I/O device obtaining the data. This can cause starvation or forward progress problems since neither device will retrieve the data. One of the other problems attributable to this situation is the loss of the interconnect and system memory bandwidth since the same cache line is requested multiple times. Accordingly, there is a need to overcome these shortcomings.

SUMMARY OF THE INVENTION

In summary, the technology of the present invention pertains to a snapshot mechanism that allows an I/O device to obtain the value of cacheable data at the time the read request was made although the value of the data may have changed thereafter. In this manner, the I/O device can make forward progress without incurring delays attributable to obtaining the updated value. The value of the data returned to the I/O device is coherent since the read request occurred before the data was updated.

A multiprocessor computer system embodying the snapshot methodology can have one or more cells connected by a high speed interconnect. Each cell includes one or more processors connected to a memory controller unit that interfaces with the interconnect. The memory controller unit is also connected to a memory bank and an I/O subsystem that includes an I/O bridge unit coupled to a number of I/O devices through one or more I/O buses.

The system memory image of the multiprocessor computer system is distributed through the processors, memory banks, and I/O bridge units of each cell. The processors and the I/O bridge units include a number of internal caches that can store the system memory image in addition to the memory banks. A portion of the system memory can be cacheable by the caches within a cell and/or by the caches of other cells. In order to ensure that the data in the main memory and the caches remain coherent, a cache coherency protocol is used.

An I/O device can request access to cacheable data by making a DMA read request to its associated host I/O bridge unit. The host I/O bridge unit may have one or more cache units that service DMA read requests originating from select PCI buses. If the requested data is not resident within its associated cache unit, the I/O bridge unit seeks the data from the system memory controller that owns the cache line where the requested data resides.

Each cache unit includes a cache controller unit and a cache having a tag, status, and data units. Each cache line in the data unit comprises a predetermined number of bytes (power of 2) and has an associated line in the tag and status units. A tag line includes a set of attributes that uniquely identifies the requesting I/O device and the I/O request, as well as other data. A status line includes a read lock and status bits indicating a number of states associated with the cache line. The read lock indicates whether or not the cache line has been returned to the original requestor. The status bits are used to maintain cache coherency and to assist the snapshot mechanism. One such state used by the snapshot mechanism is a snapshot state which indicates whether the cache line ownership has been given up due to a snoop request before the original DMA read request was serviced. A prefetch state indicates whether or not the cache line was speculatively prefetched without an explicit DMA read request.

When an I/O device requests a cache line that is not resident in the I/O bridge's cache, an entry for the cache line is made in the tag and status units of the cache. In a first embodiment of the present invention, only one I/O request is pending for a particular cache line at a time. Subsequent requests from other I/O devices for the same cache line are not processed until the cache line data is returned to the original I/O device. By storing attributes of the DMA read request that uniquely identify the original requestor and the original request, the snapshot mechanism ensures that the original I/O device will receive the cache line data readily and hence, make forward progress.

When the cache unit receives a DMA read request for a cache line that needs to be fetched from the system memory, an entry is made for the cache line in the tag and status units. The line is then fetched from the system memory by sending a request transaction to the memory controller. The read lock is set in the status unit. The system memory controller returns the data associated with the cache line to the cache unit. When the original device comes back with the original request, the cache unit provides data to the device and removes or resets the read lock. In the meanwhile, the cache unit may provide data to other devices from the cache line but keeps the read lock intact.

If the cache unit receives a snoop request from the system memory controller for this cache line before the data is served to the original requestor (i.e., read lock is set), it gives up ownership of the cache line. Simultaneously, it takes a snapshot of the cache line. Once in the snapshot state, only data can be given to the original requester for the original request. When the original requestor comes back with the original request, data is given from the snapshot cache line and invalidated when the original transaction disconnects.

The snapshot mechanism does not pertain to prefetched data. This is due to the fact that there are no assurances that the prefetched data may ever be explicitly requested by the original I/O device as part of the original request. Furthermore, it cannot be assumed that the copy resident in the cache is valid at the time when a request is made. For this reason, a prefetch status state is set for those cache lines that are prefetched. In addition, cache lines that are marked prefetched are not eligible to be converted to snapshot.

In one embodiment of the invention, the snapshot mechanism accommodates the manner in which DMA read requests are made pursuant to the PCI bus protocol or any other I/O bus protocol. In this embodiment, a DMA read request pertains to a specific cache line of data. When the cache line is not resident in the local cache, the requesting I/O device is instructed to make a subsequent request for the cache line until the cache line resides in the local cache.

In another embodiment of the invention, the snapshot mechanism accommodates split read transactions which are supported by other bus architectures. In a split read transaction, a DMA read request is for a contiguous-block of data that can span one or more cache lines. The DMA read request is serviced by the target device without the requester having to make subsequent requests. The host I/O bridge has the responsibility of providing the requested data to the requesting device.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
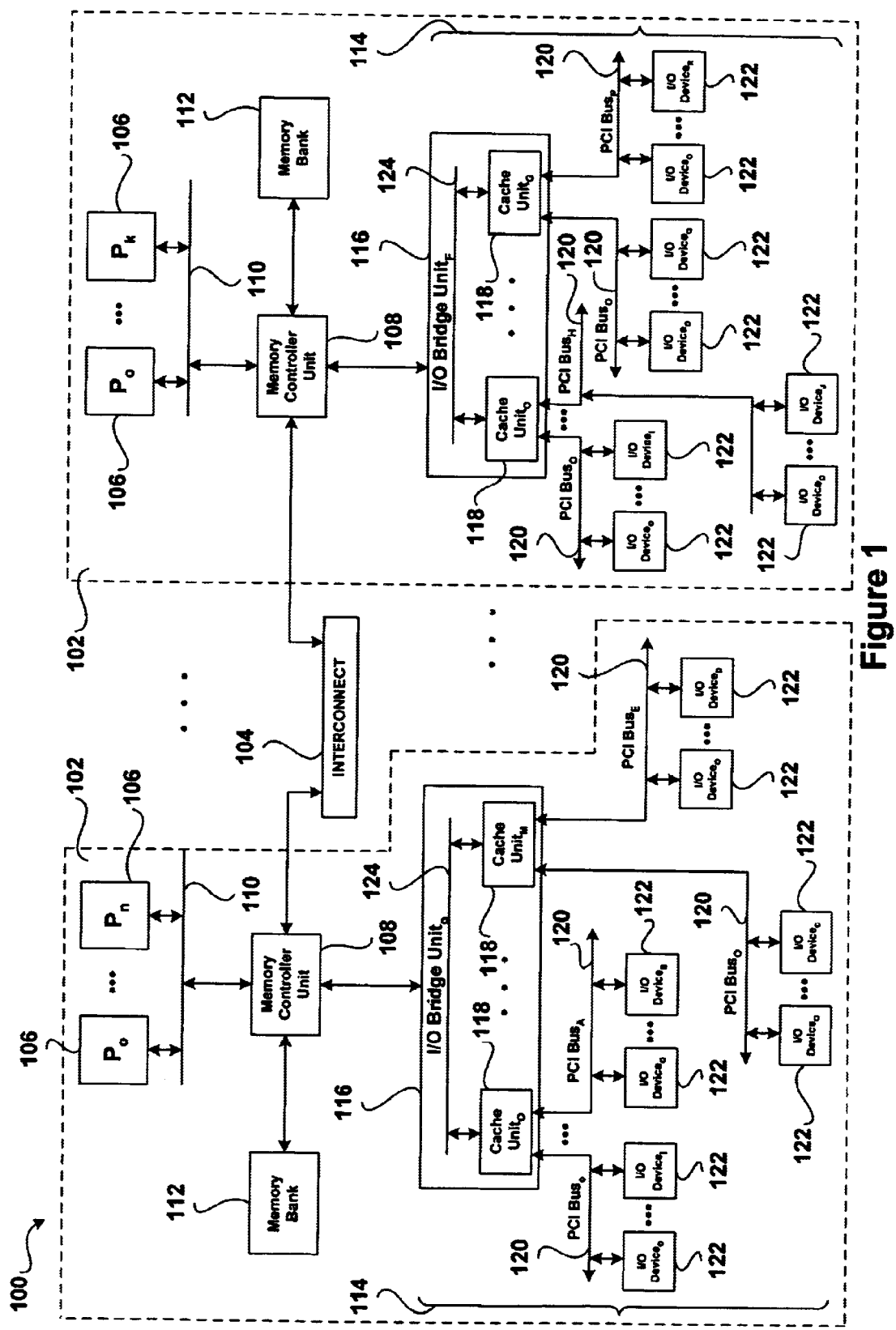
FIG. 1 is a schematic view of an exemplary computer system in accordance with an embodiment of the present invention.

FIG. 1 illustrates an exemplary computer system 100 embodying the technology of the present invention. There is shown a number of cells 102 connected through an interconnect 104. Each cell 102 can include a number of processors (e.g., $P_0$–$P_n$) 106 connected to a memory controller unit 108 by a first communication link 110, such as a bus. The memory controller unit 108 is also connected to a memory bank 112 and an I/O subsystem 114.

The processors 106 can be any type of processor or central processing unit ("CPU"), such as but not limited to, microprocessors and the like. Examples of such microprocessors include the Hewlett-Packard ("HP") PA-RISC family of microprocessors, the Intel IA-32 and IA-64 microprocessors, and the like. Each processor 106 has several levels of internal caches (not shown) that store a portion of the system memory that can be accessed by other processors 106 in the cell 102 and by other cells 102.

The memory controller unit 108 controls access to the system memory. The memory banks 112 can be composed of any type of memory device or combination thereof, such as DRAM, SRAM, RAM, flash memory, and the like.

Each cell 102 includes a portion of the system memory and the requisite components that maintain the system memory in a coherent manner. The system memory image of the multiprocessor computer system 100 is distributed throughout each cell 102 and can be partitioned to be accessible within each cell 102 and by other cells 102. For example, the system memory can include interleaved memory which is memory that is interleaved across cells 102 or non-interleaved memory which is memory that is accessible within a cell 102.

The interconnect 104 can be any type of high-speed communication link, such as but not limited to, a network, point-to-point link, crossbar switch, or the like. Preferably, a crossbar switch is used.

The I/O subsystem 114 can include an I/O bridge unit 116 connected to a number of I/O devices 122 through a second bus 120, such as the Peripheral Component Interface ("PCI") bus. It should be noted that the technology of the present invention is not limited to the PCI bus 120 and that other communication links can be used. A more detailed description of the architecture and operation of the PCI bus can be found in Solari and Willse, *PCI Hardware and Software Architecture and Design*, 4th edition, Annabooks (1998), in Mindshare, *PCI System Architecture*, 3rd edition, Addison Wesley (1996), and in *PCI Specification rev. 2.1* from the PCI Special Interest Group each of which are hereby incorporated by reference as background information.

The I/O bridge unit 116 includes one or more cache units 118 that can store a select portion of the system memory. It should be noted that the I/O bridge unit 116 includes other components that are not shown. The cache units 118 are connected by a local communications link 124, such as a bus, and are connected to the interconnect 104 through the memory controller unit 108. Each cache unit 118 is also connected to one or more PCI buses 120 that are coupled to one or more I/O devices 122. The I/O devices 122 can include, but are not limited to, host bus adapters, bus bridges, graphics adapter, printers, audio peripherals, motion video peripherals, and the like.

Figure 2:
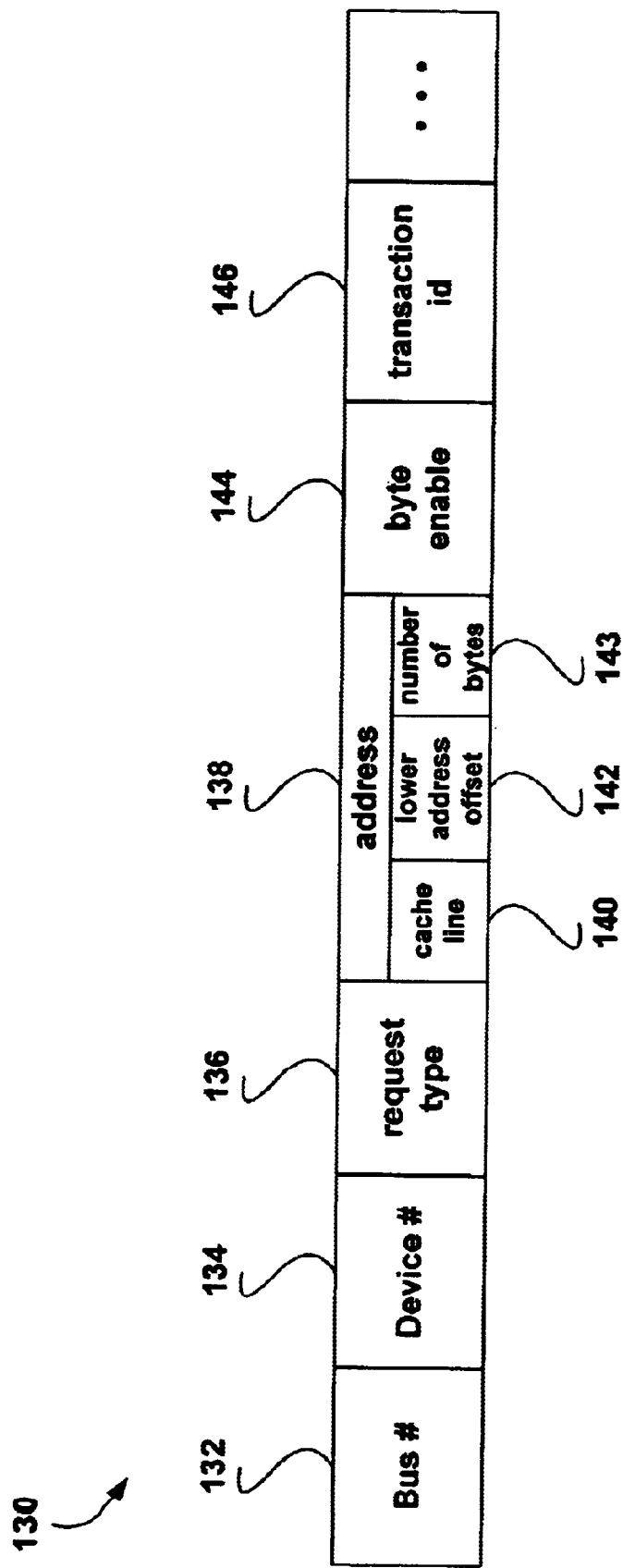
FIG. 2 illustrates the layout of an exemplary bus request for data in accordance with an embodiment of the present invention.

Each cache unit 118 is configured to support the DMA read requests for cacheable data initiated from a select group of I/O devices 122. FIG. 2 illustrates an exemplary DMA read request 130 that a cache unit 118 can receive from an associated PCI bus 120. Such a memory request 130 can include the following information:

Bus #, 132—the identifier of the PCI bus initiating the DMA read request which is preassigned in accordance with the PCI protocol;

Device #, 134—the identifier of the PCI device initiating the DMA read request which is preassigned in accordance with the PCI protocol;

Request Type, 136—indicates the type of memory access that is needed;

Address, 138—indicates the following:
  cache line, 140—indicates the address of the cache line that is the subject of the DMA read request; and
  lower address offset, 142—indicates the starting address of the DMA read request down to the number of bytes representing the PCI data bus width;
  number of bytes, 143—indicates the number of bytes requested and this field is used in the split read embodiment;
  Byte Enable, 144—indicates the bytes to be transferred and the data paths to be used in the transfer of the data;
  Transaction Identifier, 146—is a unique identifier that identifies the DMA read request and is used in the split read embodiment;
  as well as other data not shown.

Attention now turns to the design and operation of the cache unit 118.

Figure 3:
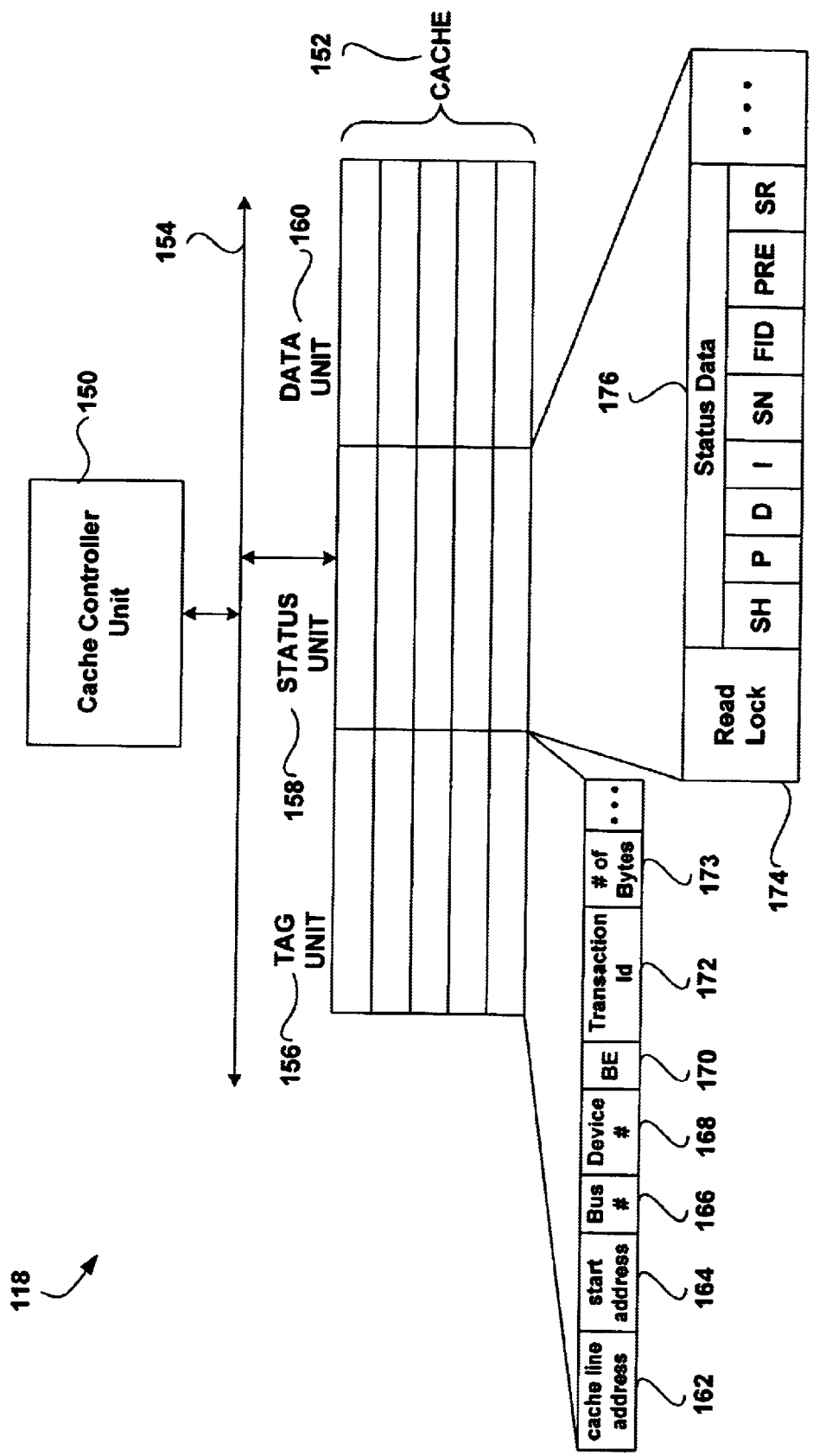
FIG. 3 is a block diagram illustrating the cache unit of the I/O bridge unit shown in FIG. 1.

FIG. 3 illustrates the cache unit 118 of the I/O bridge unit 116. Each cache unit 118 includes a cache controller unit 150 that is connected to a cache 152 through a local communication link 154, such as a bus. Although the cache controller unit 150 is shown as a single unit, the cache controller unit 150 can be composed of a number of logic units that each perform one of the various functions that the cache controller unit 150 handles.

The cache 152 can be composed of a tag unit 156, a status unit 158, and a data unit 160. The data unit 160 stores a single cache line, which is preferably 64-bytes of data. Each cache line has an associated tag line that is stored in the tag unit 156 and an associated status line that is stored in the status unit 158.

As shown in the FIG. 3, a tag line 156 can include the following data:

cache line address, 162—is the address of the cache line in the associated data unit 160;

start address, 164—is the address indicating the location of the initial block of data associated with the corresponding cache line and is the value taken from the lower address offset, 142 of the DMA read request 130;

bus #, 166—is the identifier of the PCI bus requesting the cache line and is the value taken from the bus identifier field 132 of the DMA read request 130;

device #, 168—is the identifier of the device requesting the cache line data and is the value taken from the device identifier field 134 of the DMA read request 130;

Byte Enable ("BE"), 170—indicates the bytes to be transferred and the data paths to be used to transfer the data. This value is taken from the byte enable field 144 of the DMA read request 130;

transaction identifier, 172—is the identifier of a transaction initiating the DMA read request 130 and is used in the split read embodiment of the present invention, the value is taken from the transaction identifier field 146 of the DMA read request 130;

number of bytes, 173—is the number of bytes that is subject to the DMA read request and this data is used in the split read embodiment;

as well as other data which is not shown.

The tag unit 156 stores all of the above mentioned information in part, to identify the originator and the originating request. Since a cache unit 118 can support multiple PCI buses 120, the combination of both the PCI bus identifier 166 and the device identifier 168 is stored in order to uniquely identify the requesting or originating I/O device 122. The start address 164 and the byte enable 170 information is stored in order to uniquely identify the original request in the case of a non-split-read transaction. The combination of both these attributes 164, 170 identifies the first data phase that will be repeatedly initiated by a device 122 when the device 122 does not obtain the requested data initially. In the split read embodiment, the transaction identifier is used to uniquely identify the original request.

An exemplary layout of the status line 158 is also shown in FIG. 3 and can include the following data:

read lock, 174—a variable indicating that an I/O device 122 has requested the corresponding cache line and the cache line has not yet been returned to the requesting I/O device 122;

status data, 176—the status data 176 can indicate one or more of the following cache line states:

SH—indicates shared state which means the cache line is present in the cache 152 and contains the same value as in main memory. Another device may read this cache line but cannot write to it;

P—indicates private state which means that the cache line is present in the cache 152 and the cache 152 has read and write access to the cache line. Private also includes exclusive or modified states. Exclusive means that the cache line contains the same value as in main memory. Modified means that the cache line contain a more recent value than main memory. A cache line with a private state is considered valid in the cache 152 although it is considered invalid in other caches;

D—indicates dirty state which means the cache 152 has the data marked private and the value has been updated only in this cache 152.

I—indicates invalid state which means the cache line does not represent the current value of the data;

SN—indicates snapshot state which means the cache line represents a value that was current at the time a read request was made and was snooped thereafter;

FIP—indicates Fetch-In-Progress("FIP") state which means that the cache line is being fetched by the cache unit 118;

PRE—indicates prefetch state which means that the cache line is being prefetched by the cache unit 118 in absence of an explicit read request from a device for the cache line; and SR—indicates Split Read ("SR") state which means split read mode which will be discussed in more detail below;

as well as other data that is not shown.

Multiple snapshots may be allowed for different DMA read requests to the same cache line. A line would be fetched for a new request even if a snapshot exits. That line may be snooped on a subsequent snoop resulting in multiple snapshots.

The foregoing discussion has described an exemplary computer system 100 that embodies the technology of the present invention. Attention now turns to a brief description of the operation of the snapshot mechanism of the present invention.

The purpose of the snapshot mechanism is to return a copy of cacheable data at the time the request is made for it even though the data may be altered after the request is made. In this manner, the data can be readily returned to the requesting I/O device 122 thereby eliminating the need to obtain the updated value which can increase the latency time of the DMA read request. This guarantees forward progress.

The snapshot mechanism pertains to an DMA read request to read cacheable data that is not available in the cache 152 of the associated I/O bridge unit 116. The I/O bridge unit 116 makes a memory request to obtain the requested data from the memory controller unit 108. The source of the requested data can be in another cache or memory bank 112 of the same cell 102 or another cell 102. The data is provided to the cache. It may be snooped out due to a remote cache requesting private ownership. Once the cache gives up ownership, that data may change. However, the snapshot data was the data that the original request would have got if it made its retry earlier. Hence, the snapshot data can provided. This data is then invalidated since it is considered stale for any subsequent requests.

The snapshot mechanism operates by maintaining a read lock 174 for each cache line that has a pending explicit DMA read request. The read lock 174 indicates whether or not the cache line has not been returned to the original requestor 122. In addition, the snapshot mechanism maintains the identity of the original requester and the original request. This information ensures that the original requestor 122 receives the data first and that only the original requestor 122 receives the old value of the cache line when it is updated after the I/O request was made for it. All other requests receive the updated value since the cache will not give the snapshot data to new requests and will explicitly request the cache line from the system for them. A snapshot state is used by the snapshot mechanism to track when the cache line ownership is no longer with the cache unit. If the snapshot state is not set and the cache line is valid, other devices or transactions can access the data. If the snapshot is set, only the original I/O device 122 receives the cache line for the original request.

The snapshot mechanism does not pertain to prefetched data. This is due to the fact that there are no assurances that the prefetched data may ever be explicitly requested by an I/O device 122 or part of the original transaction. Furthermore, it cannot be assured that the copy resident in the cache 152 is valid at the time when a DMA read request may be made. For this reason, steps are taken to assure that prefetched data is not marked in the snapshot state.

In a first embodiment of the invention, the snapshot mechanism accommodates the manner in which DMA read requests 130 are made pursuant to the PCI bus protocol. In this embodiment, an DMA read request 130 pertains to a specific cache line of data. When the cache line is not resident in the local cache, the requesting I/O device 122 is retried and makes a subsequent request for the cache line.

In another embodiment of the invention, the snapshot mechanism accommodates split read transactions which are supported by other bus architectures, such as, but not limited to, the PCI-X, Next Generation I/O ("NGIO"), Future I/O ("FIO"), and Infiniband architectures. A split read transaction is a DMA read request for data that can span one or more cache lines. In a typical split read transaction, the request is for X bytes of data relative to starting address Y. The I/O bridge unit 116 then returns X bytes of data which can span one or more cache lines. In addition, once the requesting I/O device 122 makes the DMA read request, it does not need to retry the DMA read request in the event the requested data is not resident in the cache 152 of the I/O bridge unit 116. Instead, the cache controller unit 150 returns the cache line as soon as it receives the line.

Attention now turns to a more detailed discussion of the implementation of the snapshot mechanism.

Figure 4:
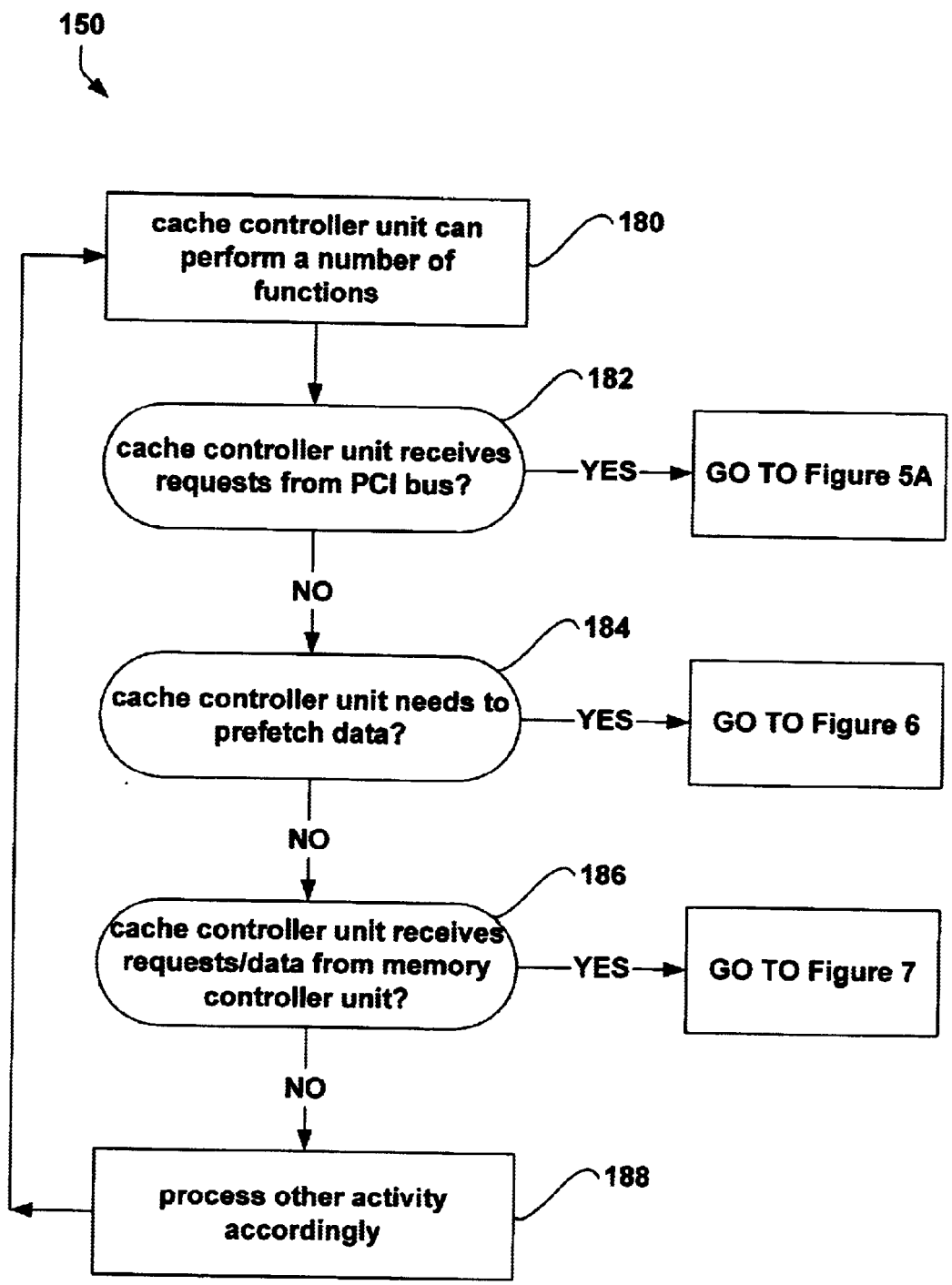
FIG. 4 is a block diagram illustrating the steps used by the cache controller unit in accordance with an embodiment of the present invention.

FIG. 4 illustrates some of the functions performed by the cache controller unit 150 (step 180). The cache controller unit 150 can receive DMA read requests from the I/O devices 122 through the PCI buses 120 (step 182) which is described in more detail in FIGS. 5A–5B. Additionally, the cache controller unit 150 can prefetch data (step 184) which is described in more detail in FIG. 6. As noted above, in order to maintain cache coherency, the cache controller unit 150 receives snooped memory requests from the memory controller unit 108 as well as the requested data (step 186) and this operation is described in more detail in FIG. 7. Other types of actions are performed by the cache controller unit 150 (step 188) which are not discussed herein. It should be noted that the order in which these operations are shown in FIG. 4 is done for illustration purposes only and is not a limitation on the technology of the present invention.

Figure 5A:
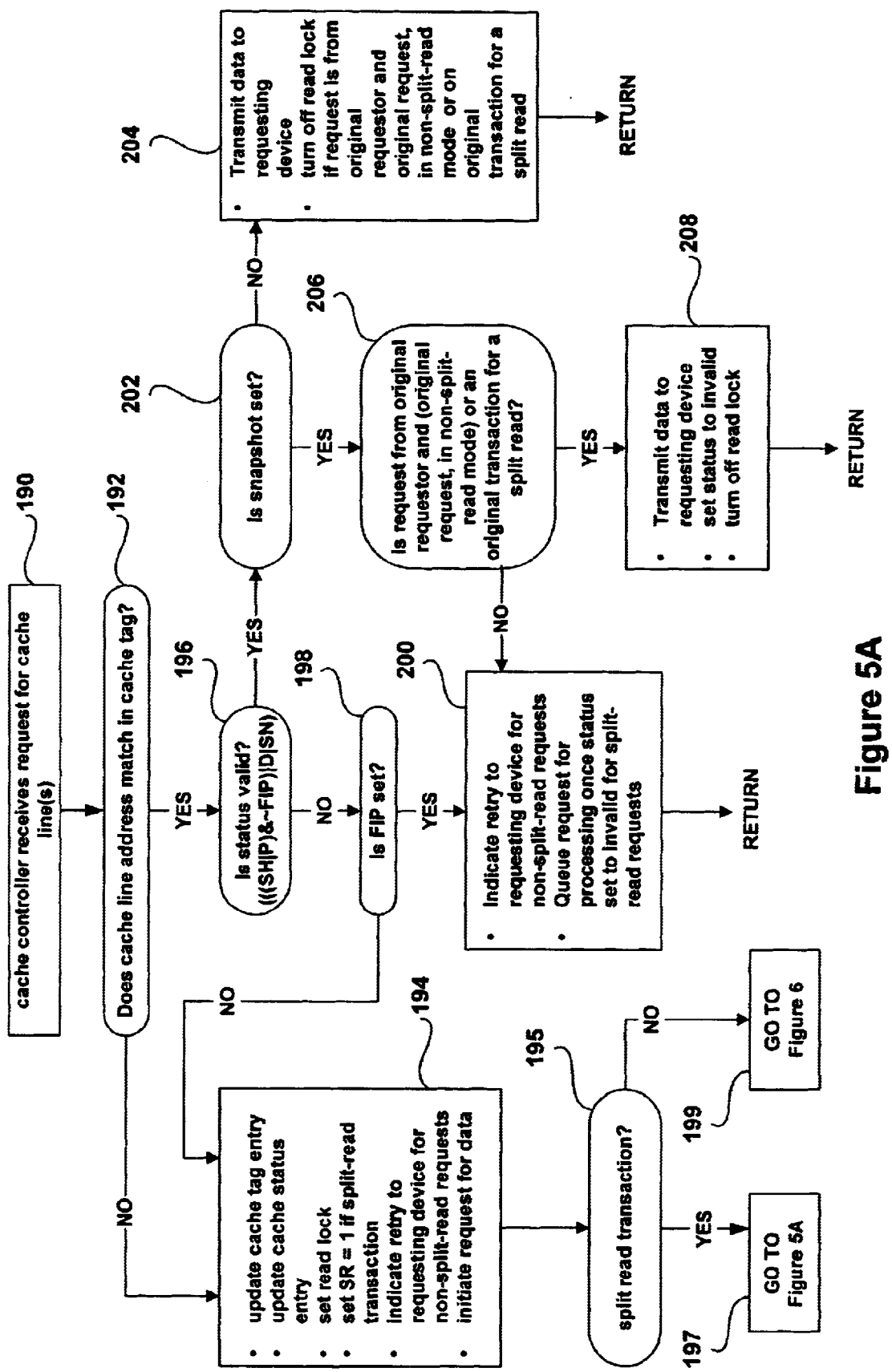
FIGS. 5A–5B are block diagrams illustrating the steps used by the cache controller unit to process DMA read requests to the memory controller unit in accordance with an embodiment of the present invention.

Attention now turns to the operation of the multiprocessor computer system 100, and in particular, the cache controller unit 150, to process an DMA read request. Referring to FIG. 5A, the cache controller unit 150 will receive a request for a particular cache line with the information shown in FIG. 2 (step 190). The cache controller unit 150 will check if the requested cache line is already stored in the cache 152 by matching the requested cache line address 140 with the cache line addresses 162 stored in the cache tag unit 156 (step 192).

If there is no match (step 192-NO), then an entry is placed into the cache tag 156 and cache status 158 units for this request (step 194). The cache tag line for this entry will include the cache line address 162, start address 164, bus #166, device #168, and byte enable 170 which was described above with respect to FIGS. 2–3 for a non-split read transaction. In the case of a split read transaction, the tag entry will includes the cache line address 162, bus #166, device #168, transaction identifier 172, and number of bytes 173. The status line for this cache line will set the read lock 174 (i.e., read lock='1'b) and set the status data 176 bits as follows. The SH or the P bit will be set in accordance with the request type 136. The PRE and SN bits will be turned off (i.e., PRE=SN='0'b) and the FIP bit will be set (i.e., FIP='1'b). In the case of a split read transaction, the SR bit is set (i.e., SR='1'b) and for non-split-read transactions, the SR bit is turned off (i.e., SR='0'b).

For I/O requests that are not split-read transactions, the cache controller unit 150 will indicate that the requesting I/O device 122 should request the data at a later time (step 194). For a local bus operating in accordance with the PCI interface, the cache controller unit 150 can initiate a "retry" to the requesting I/O device 122 (step 194). In addition, the cache controller unit 150 takes the appropriate actions to request the cache line from the memory controller unit 108 (step 194).

Figure 6:
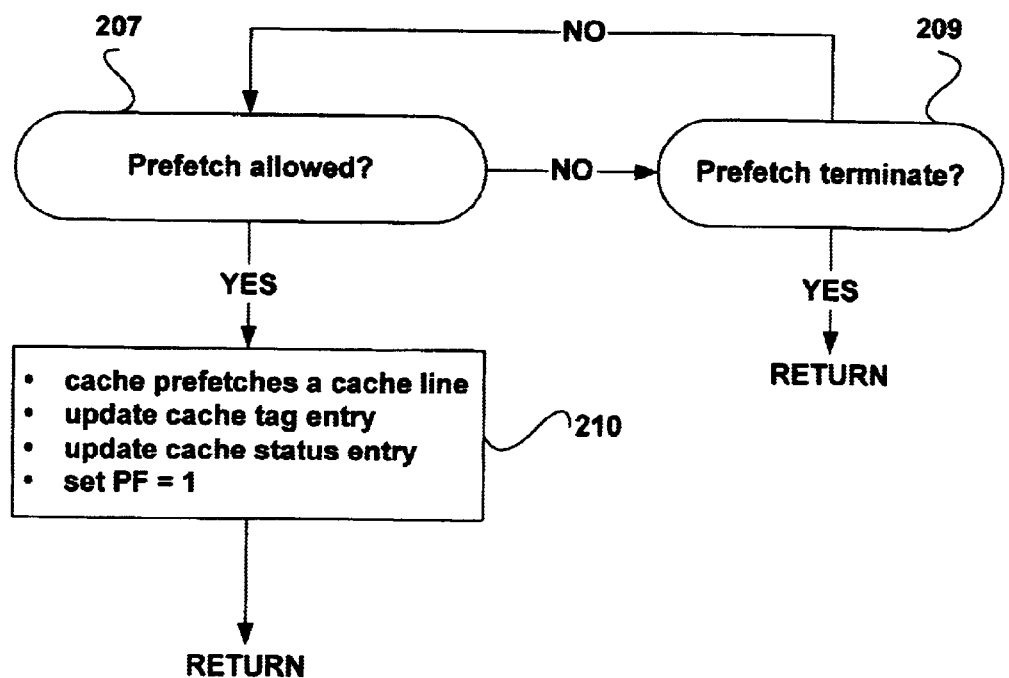
FIG. 6 is a block diagram illustrating the steps used by the cache controller unit to prefetch data in accordance with an embodiment of the present invention.

In the case where the DMA read request is not part of a split read transaction (step 195-NO), the cache controller unit 150 may prefetch data which is discussed in more detail in FIG. 6 (step 199). In the case of a split read transaction (step 195-YES), the cache controller unit 150 has to make a cache tag and status entry in the cache 152 for each cache line within the requested range (i.e., start address+number of bytes−1)

Figure 5B:
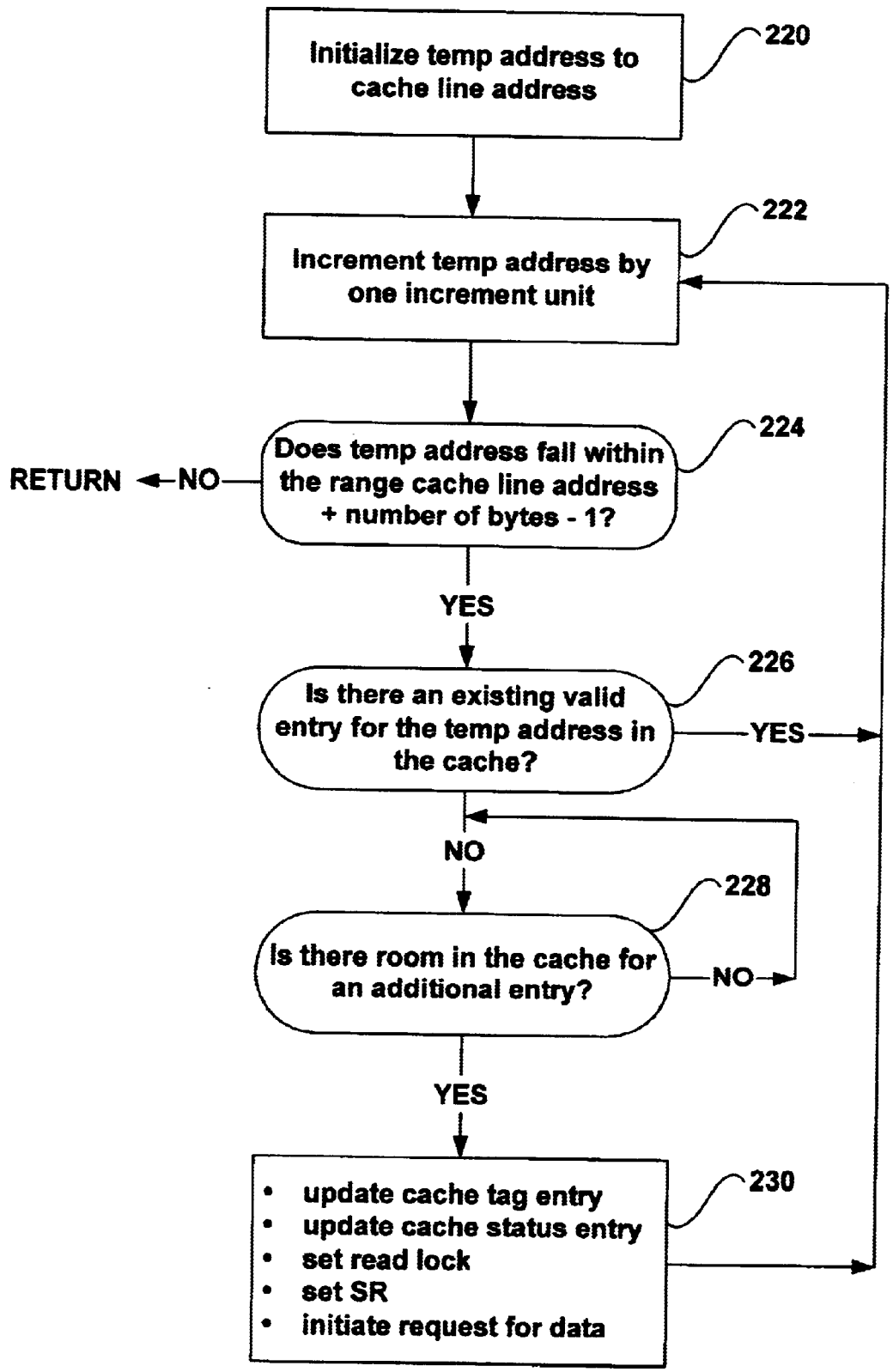

Referring to FIG. 5B, a temp address variable is initialized with the cache line address of the initial DMA read request (step 220). Since an entry was made for the first cache line, the temp address is incremented by one increment unit to the next cache line address (step 222). Preferably, the increment value is 64-bytes which is the size of the cache line (step 222). Next, a check is made to determine if the temp address is within the requested range specified in the DMA read request 130 (step 224). As noted above, the requested range is the range specified by: cache line address +the requested number of bytes −1 byte (step 224). If the temp address is outside of this range (step 224-NO), then an entry has been made for each requested cache line and no further processing is needed.

Otherwise (step 224-YES), a check is made to determine if the cache 152 currently has a valid entry for the cache line (i.e., SN, P, D, or SN='1'b) represented by the temp address (step 226). If no such entry exists (step 226-NO) and there is room for the entry in the cache 152 (step 228-YES), then such an entry is made (step 230). If the entry exists (step 226-YES), then the process proceeds to the next cache line (step 222). If there is no such entry (step 226-NO) and there is no room for the entry (step 228-NO), the cache controller unit 150 waits until an entry becomes available.

When an entry is made in the cache tag and status units for the cache line (step 228-YES), the cache tag entry includes the cache line address 162, bus #166, device #168, transaction identifier 172, and number of bytes 173 (step 230). The status line for this cache line will set the read lock 174 (i.e., read lock='1'b) and set the status data 176 bits as follows (step 230). The SH and P bits will be set in accordance with the request type 136. The PRE and SN bits will be turned off (i.e., PRE=SN='0'b), the FIP bit will be set (i.e., FIP='1'b), and the SR bit is set (i.e., SR='1'b) (step 230). The process proceeds to the next cache line (step 222) until all cache lines within the requested range are processed.

Referring back to FIG. 5A, in the case where the cache line exists in the cache tag unit 156 (step 192-YES), the cache controller unit 150 checks the status of the cache line (step 196). If the cache line is invalid (i.e., I='1'b) (step 196-NO) and there is an outstanding fetch in progress for the data (i.e., FIP='1'b) (step 198-YES), the cache controller unit 150 indicates a "retry" to the requesting I/O device 122 in the case of a non-split-read transaction (step 200). In the case of a split read transaction, the cache controller unit 150 queues the DMA read request 130 for processing once the status bit is set to invalid (step 200).

Otherwise, if the cache line is invalid (i.e., I='1'b) (step 196-NO) and there is no outstanding fetch in progress for the data (step 198-NO), the cache controller unit 150 will initiate a request to obtain the cache line as described above in step 194. In this situation, the cache line may have been invalidated in response to a snoop bus request or as a result of a snapshot.

In the case where the cache line exists in the cache (step 192-YES) and its associated status line indicates that the cache line is valid (i.e., status=(((SH or P) &≠FIP) or D or SN) (step 196-YES), the cache controller unit 150 checks if the cache line has been snooped out after the DMA read request was made by determining whether the corresponding status line indicates a snapshot state (i.e., SN='1'b) (step 202). If the cache line is not in the snapshot state (i.e., SN='0'b) (step 202-NO), then the cache line is returned to the requesting I/O device 122 (step 204). If the DMA read request is the original request from the originating I/O device or if the original transaction is for a split read transaction, then the read lock 174 is turned off (i.e., read lock='0'b) (step 204). For split read transactions, the transaction identifier is returned with the data to the requesting I/O device 122 (step 204).

Otherwise (step 202-YES), the cache line is in the snapshot state and only the original requestor gets the cache line (step 206). The cache controller unit 150 determines if the DMA read request 130 is a subsequent request from the original requestor for the same cache line (step 206). This is done by matching the bus 166 and device 168 identifiers resident in the cache tag unit 156 with those attributes in the DMA read request 130 and by matching the cache line address 162 and the byte enable 170 resident in the cache tag unit 156 with those attributes in the DMA read request 130. If the DMA read request 130 is a subsequent request from the original requestor and for the original request (step 206-YES), then the cache controller unit 150 initiates the requisite actions to transmit the cache line to the requesting device (step 208). In the case of a split-read transaction, the cache controller unit 150 matches the transaction identifier 172 stored in the cache tag unit 156 with the one in the DMA read request 130 in order to determine if the original I/O device 122 is requesting the cache line (step 206). In addition, the cache line is invalidated (i.e., I='1'b) in order to prevent other I/O devices 122 from reading the stale value (step 208) and the read lock is cleared (i.e., read lock ='0'b).

Otherwise, if the DMA read request 130 is a subsequent request for the same data by another I/O device 122 (step 206-NO), and the data is marked in the snapshot state (step 202-YES), then the cache controller unit 150 indicates that the requesting device should retry the request at a later time in the case of a non-split-read transaction (step 200). In the case of a split read transaction, the request is queued until such time as when the cache line is invalidated (step 200).

Attention now turns to the actions of the cache controller unit 150 in prefetching data. It is common for a cache controller unit 150 to utilize a prefetch methodology to determine which cache line is to be prefetched and the technology of the present invention is not constrained to any particular prefetch methodology. Referring to FIG. 6, if a prefetch methodology is used by the multiprocessor system 100 (step 207-YES), then the cache controller unit 150 will prefetch cache lines in anticipation of an explicit memory request for that cache line (step 210). When the cache controller unit 150 prefetches a cache line, an entry is made for the cache line in the cache tag 156 and status 158 units which was described above (step 210). In this instance, the status line will indicate the prefetch state (PRE='1'b) (step 210).

If the cache controller unit 150 does not allow prefetching (step 207) and prefetching has been terminated (step 209-YES), then no other actions are taken. If prefetching has not been terminated (step 209-NO), then the cache controller unit 150 waits until such time as prefetching commences (step 207).

Figure 7:
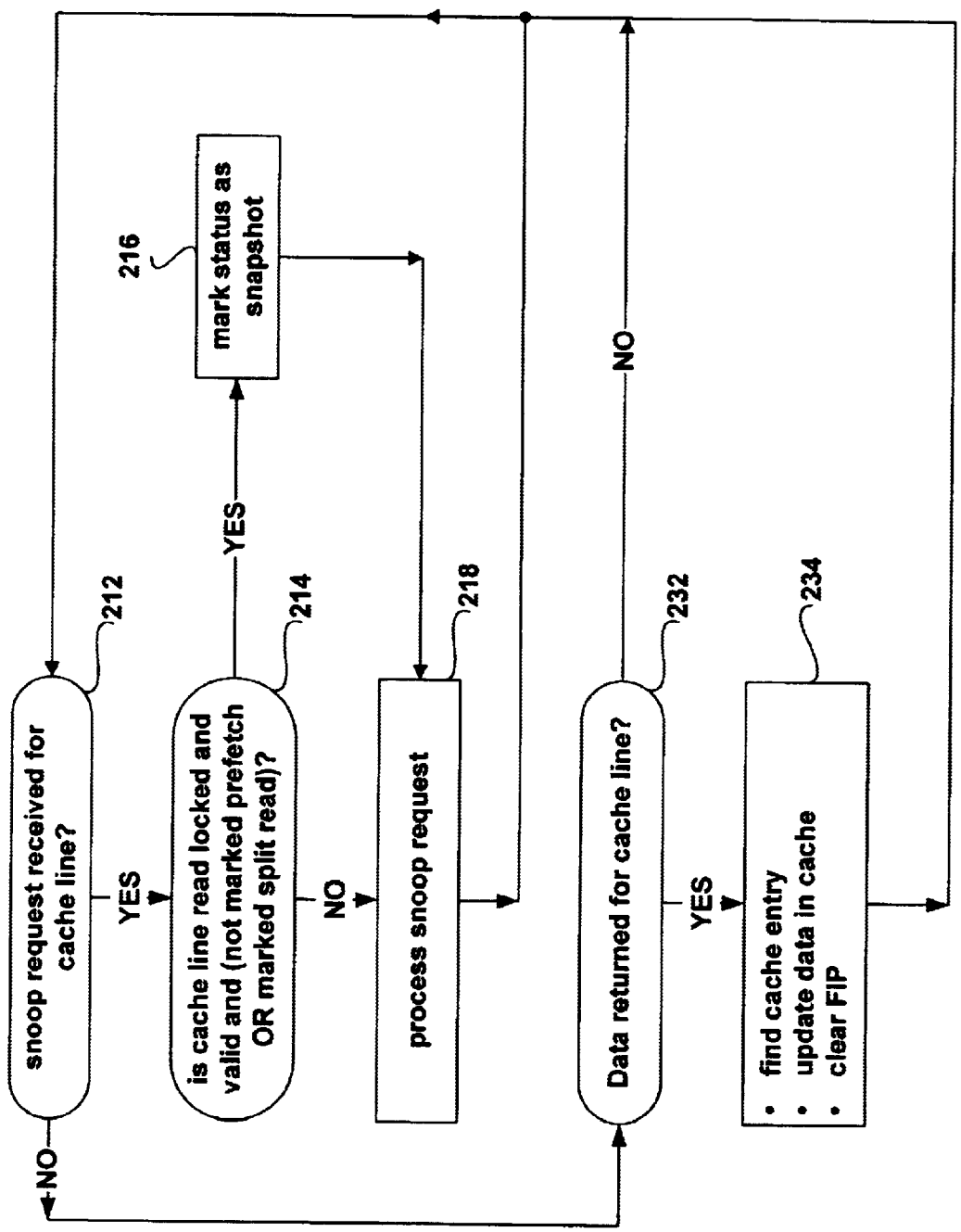
FIG. 7 is a block diagram illustrating the steps used by the cache controller unit to snoop memory requests and to receive data in accordance with an embodiment of the present invention.

Referring to FIG. 7, attention now turns to the operation of the cache controller unit 150 in response to information received from the memory controller unit 108. The memory controller unit 108 transmits snoop requests to the cache controller unit 150 (step 212) as well as the requested data (step 234). It should be noted that the cache controller unit 150 receives other types of data from the memory controller which have not been shown.

The cache controller unit 150 receives snoop requests with regards to a particular cache line from the memory controller unit 108 (step 212). The cache line is marked in the snapshot state when the following conditions are met. The cache line is valid (i.e., status ='1') and read locked (i.e., read lock ='1'b) and either the cache line has not been prefetched (status ≠'PRE') or is marked for a split read (i.e., SR='1'b). In either case (step 214-YES or step 214-NO), the snoop request is processed in accordance with the appropriate cache coherency protocol (step 218).

If there is not a snoop request for the cache line (step 212-NO), then the cache controller unit 150 checks if it is receiving a requested cache line (step 232-YES). In this case, the appropriate cache entry is found and updated with the received cache line. In addition, the FIP bit is cleared (step 234).

The foregoing description has described a snapshot mechanism consisting of an apparatus and method that enables an DMA read request to obtain cacheable data at the time the request was made despite snoops for the cache line. In this manner, forward progress can be made by the I/O device thereby improving the I/O device's latency time and the bandwidth of the system interconnect.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer system, comprising:

a cache having a plurality of cache lines, each cache line associated with a snapshot state and a first requestor waiting for the cache line; and a cache controller that
obtains the cache line from a remote source,
marks the cache line in the snapshot state when the cache line is snooped out of the cache after the first requestor requests the data and before the cache line is read by the first requestor, and
allows only the first requester to read the cache line.

2. The apparatus of claim 1, wherein the cache controller invalidates the cache line after the first requestor reads the cache line.

3. The apparatus of claim 1, the cache line associated with a prefetch state;
wherein the cache controller marks the cache line in the snapshot state when the cache line is not associated with a prefetch state.

4. The apparatus of claim 1, the cache line associated with a read lock that is set once the first requestor requests the data;
wherein the cache controller marks the cache line in the snapshot state when the read lock is set.

5. A method for operating a computer system, the method comprising the steps of:

providing a cache having a plurality of cache lines, each cache line associated with a snapshot state;

receiving a request from a first device for the cache line;

obtaining the cache line from a remote source;

marking the cache line in the snapshot state when another device claims ownership of the cache line; and returning the cache line only to the first device.

6. The method of claim 5, comprising the step of:

invalidating the cache line.

7. The method of claim 5, wherein the cache line is associated with a read lock;
the obtaining step comprising the step of setting the read lock of the cache line; and
the marking step comprising the step of not marking the cache line in the snapshot state when the read lock for the cache line is not set.

8. The method of claim 5, associating a prefetch state with the cache line; and
the marking step comprising the step of not marking the cache line in the snapshot state when the cache line is associated with a prefetch state.

* * * * *